Dec. 20, 1938. G. G. GREULICH 2,141,107
SPLICE FOR STEEL BEARING PILES
Filed Dec. 29, 1937
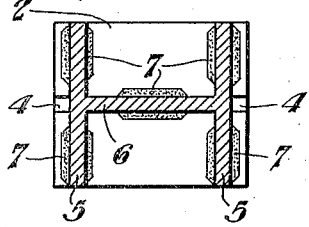
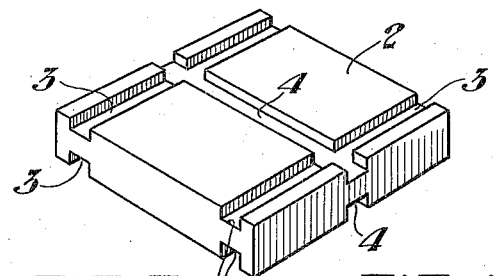
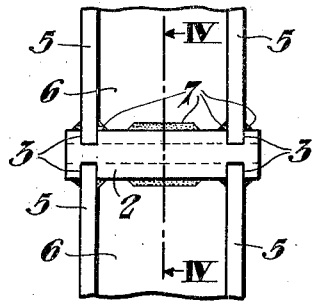
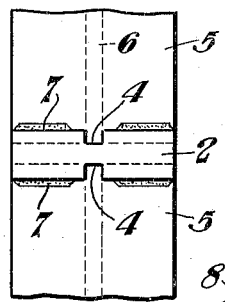
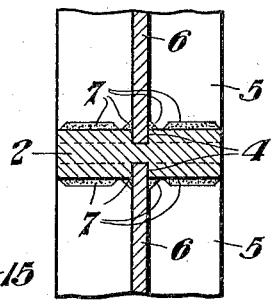
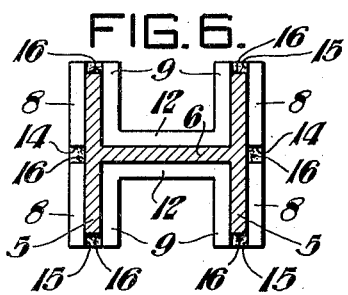
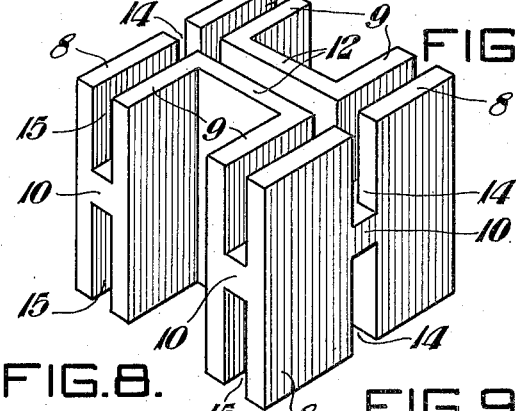
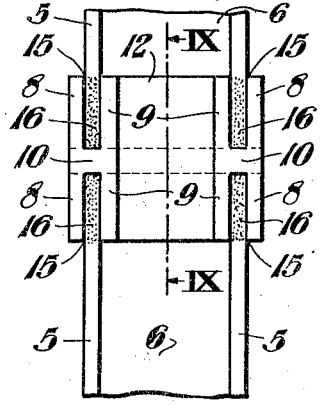
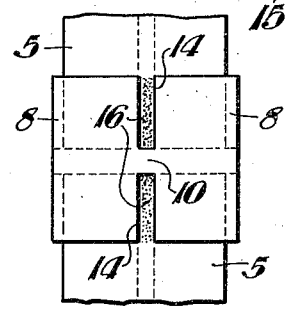
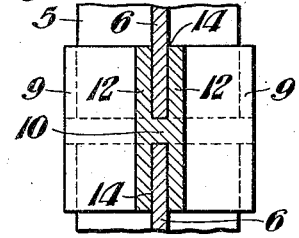
Inventor:
GERALD G. GREULICH,
by: his Attorneys.

Patented Dec. 20, 1938

2,141,107

UNITED STATES PATENT OFFICE 2,141,107

SPLICE FOR STEEL BEARING PILES

Gerald G. Greulich, Mount Lebanon, Pa.

Application December 29, 1937, Serial No. 182,356

1 Claim. (Cl. 61—53)

This invention relates to a splice for bearing piles.

An object of the invention is to provide a splice for aligning the ends of superimposed bearing pile sections.

A further object of the invention is to provide a metallic member having grooves or sockets on each face thereof for receiving the ends of superimposed bearing pile sections and minimizing interruption to the process of driving piles in spliced lengths under varying field conditions.

Other objects and advantages will become apparent as the description proceeds, in which:

Figure 1 is a transverse sectional elevation of one form of splice or joint;

Figure 2 is a front elevation of the showing of Figure 1;

Figure 3 is an elevation at right angles to Figure 2;

Figure 4 is a section on the line IV—IV of Figure 2;

Figure 5 is a perspective of the splice prior to receiving the ends of adjoining bearing pile sections;

Figure 6 is a transverse sectional elevation of another form of the present invention;

Figure 7 is a front elevation of the showing of Figure 6;

Figure 8 is an elevational view at right angles to Figure 7;

Figure 9 is a section on the line IX—IX of Figure 7;

Figure 10 is a perspective of the form of the invention shown in Figures 6 to 9, inclusive.

In the drawing, the splice shown in Figures 1 to 5, inclusive, comprises a relatively thick metal slab 2 having parallel grooves 3 formed in its top and bottom surfaces, said grooves extending continuously throughout said slab. A centrally positioned groove 4 is provided in the top and bottom surfaces of said slab at right angles to said parallel grooves.

The parallel grooves 3 are machined or otherwise formed in said slab adjacent the edges thereof and are adapted to receive and fit the flanges 5 of the bearing pile sections, while the groove 4 on each side of said slab is adapted to receive the web 6 of the bearing pile sections.

After the lower bearing pile section has been driven approximately to the ground line, the metal slab 2 is seated on top of said pile section so that the flange 5 is positioned in the grooves 3 and the web 6 in the groove 4, after which they are welded together, as shown at 7. If desired, the slab 2 may be welded to the lower piling section prior to the driving operation. The upper piling section is then positioned upon the slab 2 so that the flanges and web seat in the grooves in said slab and are welded, in any conventional manner, to said slab, which weld produces a positive joint for the transmission of vertical forces and provides such strength to said bearing pile as will resist flexural or bending stresses.

In the showing of Figures 6 to 10, inclusive, the splice or joint comprises a special thick rolled steel member having flanges 8 and 9 extending from a bearing pile supporting member 10. In this construction, the flanges 8 and 9 and web portions 12 are thicker than the thickness of the piling sections to be formed, as clearly shown in Figures 6 and 7.

In forming the splice as shown in Figures 6 to 10, inclusive, the heavy sleeve is cut to a length approximately equal to the nominal width and depth of the sections to be joined, and deep grooves 14 and 15 are machined in the top and bottom ends of said sleeve section throughout the width thereof, thus leaving openings at the ends of said grooves. After the grooves have been machined, their ends are closed by means of deposited weld metal 16 so as to form a socket to receive the ends of the piling sections being secured together. The grooves 14 receive the web 6 of the piling sections, while the grooves 15 receive the flanges 5 of the piling sections.

In such a construction, the splice or joint is set up on the lower section after it has been driven approximately to the ground line so that the flanges 5 and web 4 are seated within the grooves 15 and 14, respectively, and the upper piling section may then be positioned within the upper grooves 14 and 15 after which the three component members are then sealed and driven together with the first few blows of the pile hammer. The bearing pile supporting member 10, between the top and bottom grooves, provides means for transmittal of the vertical forces and the depth of the grooves provides a joint with high flexural strength which will resist bending moment stresses in the piling and jack-knifing of the joint or lateral displacement of the same.

While I have shown and described specific embodiments of the invention, it will be understood that I do not wish to be limited exactly thereto, since various modifications may be made without departing from the scope of the invention, as defined by the following claim.

I claim:

A splice for bearing piles comprising a metallic slab having grooves formed in the top and bottom faces of said slab, one of said grooves on one of the faces of said slab being intermediate said slab and at right angles to the other grooves.

GERALD G. GREULICH.